United States Patent [19]
Green et al.

[11] Patent Number: 5,792,754
[45] Date of Patent: Aug. 11, 1998

[54] NUTRITIONAL COMPOSITION CONTAINING FIBRES

[75] Inventors: Ceirwen Jane Green; Roelof André Bork, both of Zoetermeer; Robert Johan Joseph Hageman, Waddinxveen; Jan Albertus Boerma, Zoetermeer; Klaske Anne Van Hoey-De Boer, Woerden, all of Netherlands

[73] Assignee: N.V. Nutricia, Zoetermeer, Netherlands

[21] Appl. No.: 691,023

[22] Filed: Aug. 5, 1996

[30] Foreign Application Priority Data

Aug. 4, 1995 [EP] European Pat. Off. .............. 95202142

[51] Int. Cl.⁶ ..................... A61K 31/715; A61K 31/70
[52] U.S. Cl. ................... 514/60; 514/53; 514/54; 514/57; 514/61; 514/22; 514/23
[58] Field of Search .................... 514/53, 54, 57, 514/60, 61, 22, 23

[56] References Cited

U.S. PATENT DOCUMENTS

| | | | |
|---|---|---|---|
| 5,229,136 | 7/1993 | Mark et al. | 424/535 |
| 5,472,952 | 12/1995 | Smidt et al. | 514/54 |

FOREIGN PATENT DOCUMENTS

| | | |
|---|---|---|
| 0 483 070 | 4/1992 | European Pat. Off. . |
| 0 504 055 | 9/1992 | European Pat. Off. . |
| 0 570 791 | 11/1993 | European Pat. Off. . |
| 0 486 425 | 8/1994 | European Pat. Off. . |
| 29 37 358 | 4/1981 | Germany . |
| WO 90/04334 | 5/1990 | WIPO . |
| WO 93/00020 | 1/1993 | WIPO . |

*Primary Examiner*—John Kight
*Assistant Examiner*—Everett White
*Attorney, Agent, or Firm*—Young & Thompson

[57] ABSTRACT

A nutritional composition, suitable for enteral administration, is described which contains 5-120 g of composite dietary fibre per daily dosage of the composition or per 2000 kcal, which fibre consists of 15-50 wt. % of soluble non-starch polysaccharides, such as gum arabic or pectin, 15-45 wt. % of insoluble non-starch polysaccharides, such as cellulose and hemicellulose, and 8-70 wt. % of oligosaccharides and/or resistant starch and/or lignin. The oligosaccharides such as inulin or hydrolyzed inulin can be present at a level of 8-40 wt. %. The resistant starch may be present at a level of 5-30 wt. %. The composition may further contain carbohydrates and/or fats and/or proteinaceous material and may be dry or liquid. It may be used as a complete food or a food supplement, e.g. for clinical patients or infants.

27 Claims, No Drawings

NUTRITIONAL COMPOSITION CONTAINING FIBRES

FIELD OF THE INVENTION

The invention relates to a dietary fibre composition to be used in various types of nutritional compositions, such as clinical food, infant food or dietary food.

BACKGROUND OF THE INVENTION

Fibre plays an important role in the nutrition of healthy people. It maintains gut function and clears toxic compounds, by providing stool bulk and substrate to intestinal flora, and keeps the gut wall in good condition. Hospital patients who are critically ill or chronically sick or comatose patients who normally receive enteral clinical nutrition (ECN), need fibre for these purposes, and consumption of the right fibre mixture is especially important for patients who suffer from intestinal problems, such as ulcerative colitis, Crohn's disease, and the like, and who have received antibiotics. Also persons with constipation or with diarrhoea have special interest in this kind of nutrition, and the same applies to persons who are not able to consume the recommended daily amount of fibre for whatever reason (e.g. diet).

An optimal fibre composition will:
be similar to the normal fibre composition as consumed by healthy persons in Western countries;
produce beneficial short-chain fatty acids (SCFA) in a balanced ratio and at a sufficient and uniform rate during transit through the ileum and the large intestine;
not produce gas at too high or too low levels;
give sufficient mass to the faeces to facilitate defecation;
not drastically increase the viscosity of the faeces.

A dietary fibre composition for use in nutritional products is disclosed in International patent application WO 93/00020. It contains 5–50 wt. % of soluble, fermentable fibre (gum arabic), 5–20 wt. % of soluble, non-fermentable fibre (carboxymethylcellulose), and 45–80 wt. % of insoluble, non-fermentable fibre (oat hull). A drawback of this prior art fibre composition is that it does not show an optimal performance as to uniformity and type of short-chain fatty acids and gas production. Also, it does not result in sufficient stool bulk for hospitalized patients. Furthermore, it contains a nonnatural, chemically modified fibre, which is not desired in most nutritional compositions. It does not resemble average fibre consumption patterns in Western countries.

EP-A-483070 discloses nutritional compositions containing 10–60 g per day of hydrolyzed soluble fibre (hydrolyzed pectin and hydrolyzed guar). EP-A-486425 discloses food compositions having a pH of 3.5–3.9 containing 0–17 energy % of fibre. EP-A-504055 describes dietetic and therapeutic compositions containing modified starch and soluble fibres (pectin or soy fibres). EP-A-570791 discloses enteral nutritional low-calorie compositions for tube-fed patients with diarrhoea, containing 20 g/l of fibre (carob extract, pectin and soy polysaccharide). These products do not provide a balanced fibre composition as referred to above.

SUMMARY OF THE INVENTION

The object of the present invention is to provide a dietary fibre mixture which meets the requirements of an optimal composition as indicated above, and to provide nutritional compositions suitable for enteral administration, containing such a fibre mixture. The composition according to the invention contains 5–120 g of fibre per daily dosage of the composition, and the fibre consists of 15–50 wt. % of soluble non-starch polysaccharides, 15–45 wt. % of insoluble non-starch polysaccharides, and 8–70 wt. % of oligosaccharides and/or resistant starch.

DETAILED DESCRIPTION OF THE INVENTION

The invention provides a novel fibre mixture which is fermented at a relatively uniform rate, starting in the first part of the colon and continuing in more distal parts of the colon, to yield a relatively constant amount of SCFA's and a relatively high amount of propionic and/or butyric acid and to produce a relatively constant level of gas. Part of the mixture will not be fermented and passes to subsequent parts of the intestine, where it will be fermented and will contribute to the stool bulk and will also not increase substantially the viscosity of the faeces.

In the context of this specification, enteral administration includes liquid and dry administration forms. Liquid compositions for enteral administration comprise tube-feeds (via nasogastric, gastrostomy, jejunostomy tubes), orally consumed compositions (drinks), both as complete foods and as supplements. Dry compositions comprise powders, e.g. in cans or sachets, which are to be reconstituted or to be added to other food compositions, and also bars and the like.

The term "fibre" or "dietary fibre" is used herein to denote plant-derived food material, in particular oligo- and polysaccharides (for example cellulose, hemicellulose, oligo- and polyfructoses, pectins and gums), lignin, and resistant starch, that is not digested by the human (non-bacterial) enzymes of the intestinal tract. This means that fibre is that part of the food that is not absorbed in the small intestine and thus enters the large intestine (colon).

The term "fermentable fibre" means fibre that undergoes (anaerobic) breakdown by microorganisms in the large intestine to smaller molecules, in particular to short-chain fatty acids, such as acetic, propionic and butyric acid. Fermentation also results in the production of gases, such as carbon dioxide, hydrogen and methane. Fibre fermentability may be determined e.g. by the method described in Amer. J. Clinical Nutrition (1991), 53, 1418–1424.

The term "soluble fibre" means that the fibre is at least 50% soluble according to the method described by L. Prosky et al., J. Assoc. Off. Anal. Chem. 71, 1017–1023 (1988).

Examples of soluble non-starch polysaccharides include long-chain inulin (a polysaccharide mainly consisting of fructose units), pectin (a polysaccharide mainly consisting of galacturonic acid and rhamnose units), β-glucans (small cellulose-type branched glucose polymers), gum arabic, tragacanth, mucilages, guar and locust bean gum, agar, carageenans, alginates, xanthan and the like. Most of these soluble fibres are fermnentable for the largest part. In particular the proportion of soluble non-starch polysaccharides is within the range of 20–40 wt. %. The terms "polysaccharide" and "long-chain" both refer to polymers having more than 20 monosaccharide units (degree of polymerization >20).

Examples of insoluble non-starch polysaccharides include cellulose (for example derived from oat hull, soybeans, cereal bran) and hemicellulose (mostly branched arabinoxylans or galactans, e.g. from cereals, potatoes or soybeans). Most of these insoluble fibres are partly fermentable or non-fermentable. In particular the proportion of insoluble non-starch polysaccharides is within the range of 20–40 wt. %.

In addition to the non-starch polysaccharides (soluble and insoluble), the fibre composition according to the invention contains either oligosaccharides or resistant starch or preferably both, and/or lignin. Oligosaccharides are understood to comprise any saccharide containing at least two and up to 20 monosaccharide units, whether of starch (α-glucan) or non-starch type. Examples of oligosaccharides include fructo- and galacto-oligosaccharides, such as hydrolyzed inulin and levan (fructans), and short-chain amylodextrins and the like. The oligosaccharides are usually soluble and largely fermentable. Especially preferred are oligosaccharides having an average chain length (degree of polymerization) of between 3 and 9 monosaccharide units. Preferably, the fibre composition according to the invention consists of 8–40 wt. %, more preferably of 12–30 wt. % of oligosaccharides, especially inulin and hydrolyzed inulin, or a derivative thereof.

Since native inulin usually consists of a mixture of polyfructoses of varying chain length, both under and over 20 monosaccharide units, it can contribute both to the non-starch polysaccharides and to the oligosaccharides as defined above, depending on its specific composition.

Resistant starch is commonly known and generally consists of any type of starch that escapes digestion and intestinal absorption and can be formed during processing of starchy foods. In some starches the crystalline structure will be altered or retrograded by these processes, which make the starch difficult to be digested. Resistant starch may also be obtained from raw foods, such as potatoes or green bananas. Resistant starch is normally insoluble and the fermentability varies with the source. Preferably, resistant starch is present in the fibre mixture of the invention (in addition to the oligosaccharides), especially at a level of 5–30 wt. %, more preferably of 8–25 wt. % with respect to the total fibre composition.

When all components of the fibre mixture according to the invention are classified as soluble or insoluble, the fibre consists of 25–80 wt. % of soluble fibre and 20–75 wt. % of insoluble fibre. The soluble part of the fibre mixture, mainly comprising oligosaccharides and soluble non-starch polysaccharides, and some of the resistant starch, should have a fermentability of at least 80%, preferably at least 90%. In particular, the fibre mixture consists of 35–65 wt. % of soluble fibre. The insoluble part of the fibre mixture, mainly comprising resistant starch and insoluble non-starch polysaccharides (cellulose, hemicellulose), should have a fermentability of between 5 and 50%, especially between 20 and 40%. In particular, the fibre mixture contains 35–65 wt. % of insoluble fibre.

In addition to the fibre polysaccharides, the nutritional composition according to the invention also preferably contains small amounts of lignin or lignin derivatives, in particular, 1–5 wt. % of lignin. Preferably, the composition does not contain chemically modified fibres, such as carboxymethyl starch of hydroxyethyl cellulose.

The fibre content of the nutritional compositions according to the invention can be expressed in the amount of fibre to be taken per day, as defined above, i.e. 5–120 g per daily dosage, or especially 8–70 g per daily dosage. Instead, the fibre content for non-low-calorie compositions can also be expressed as weight of fibre per energy unit. Thus, the nutritional composition may contain 5–120 g, preferably 8–70 g of fibre per 2000 kcal of energy. These values apply both to dry compositions and to liquid compositions or reconstituted compositions.

For dry compositions, it may be convenient to express the fibre content with respect to the total dry matter of the composition. Thus dry nutritional compositions according to the invention may contain 0.5–100 g of fibre per 100 g. The higher levels, e.g. 50–100 g per 100 g, apply to dry fibre supplements to be administered in combination with other, standard food compositions. An example is a 100% fibre powder. Intermediate levels, e.g. between 5 and 80 g per 100 g, may apply to fibre-reinforced food supplements or complete nutritional compositions, e.g. for clinical uses. As an example, a low-calorie bar may contain 20–80 g of fibre per 100 g of product, the remainder consisting of e.g. maltodextrin and/or protein. The lower levels, e.g. between 0.5 and 25 g per 100 g, may apply to special compositions, such as infant formulae. For example, a dry infant formula can contain 1 g of fibre in a total of 100 g.

As an alternative, the nutritional composition may be a liquid composition, or a powder which is to be reconstituted by dilution with water. In that case, the composition contains 5–120 g of fibre per 1, in particular 10–100 g/l. In case of liquid compositions, the pH is preferably between 3.5 and 8.

Apart from a pure fibre supplement, the nutritional composition will further contain digestible carbohydrates and/or fats and/or proteinaceous material.

The digestible carbohydrates (to be distinguished from the indigestible fibre carbohydrates) constitute part or all of the energy source. Digestible carbohydrates to be used may include monosaccharides such as glucose, fructose, galactose and ribose, disaccharides such as lactose, sucrose and maltose, and digestible oligo- and polysaccharides such as starch-derived material, including maltodextrins. The latter are the preferred carbohydrates for nutritional compositions intended for clinical nutrition.

The fats optionally contained in the nutritional compositions may be the usual nutritional fats. Fat-containing compositions according to the invention further preferably contain fats with long-chain polyunsaturated fatty acids (PUFA's), especially parent PUFA's linoleic acid (ω-6 series) and α-linolenic acid (ω-3 series) and higher homologues produced by alternate desaturation and elongation of the parent PUFA's. These higher homologues include γ-linolenic acid (GLA: C18:3 ω6) and stearidonic acid (SDA: C18:4 ω-3) and subsequent homologues (C20:3, C20:4, C22:4, C22:5, etc. of the ω-6 series, and C20:4, C20:5, C22:5, C22:6, etc. of the (ω-3 series). Including the parent PUFA's, the preferred level is between 3.5 and 12 energy % of the composition, especially 5–en. %. The preferred level of the total homologues (GLA+SDA and higher) is between 0.2 and 5 en. %, especially between 0.5 and 2.5 en. % of the composition. Preferably, a fat-containing composition also contains an antioxidant such as tocopherol.

The proteins to be optionally used in the nutritional compositions according to the invention can be those commonly present in tube feeding, infant formulae and other foodstuffs. Preferred proteinaceous materials include caseins, whey, soy protein, and partially denatured whey proteins, or partially hydrolyzed whey proteins. The partly denatured whey proteins are especially beneficial for complete nutritional compositions. The preferred level of partly denatured whey proteins corresponds to at least 20% of the total protein content, more preferably 40–100 wt. % of the total protein content, or alternatively preferably 2–30, more preferably 4–20 wt. % of the dry matter content of the composition.

EXAMPLES

Example 1

A fibre composition was prepared by mixing 32 wt. % of soy polysaccharide, 12 wt. % of α-cellulose, 24 wt. % of gum arabic, 23 wt. % of Raftilose® (hydrolyzed inulin) and 9 wt. % of Novelose® (resistant starch), followed by spray-drying.

Example 2

A complete liquid clinical food composition was prepared by mixing 1–2 g of the fibre mixture according to example 1, 4–25 energy % (1.0–7.5 g) of protein, 40–78 en. % (12–24 g) of carbohydrate, 8–50 en. % (1–11 g) of fat including 0.5–1.5 g of PUFA's, in addition to Na (90 mg), K (180 mg), Cl (130 mg), Ca (85 mg), P (70 mg) and Mg (26 mg) per 100 g, and further Fe (1.2 mg), Zn (1.2 mg), Cu (0.2 mg), Mn (0.3 mg), F 0.1 µg), Mo (6 µg), Se (6 µg), Cr (4 µg), I (10 µg), vitamins (A, D, E, K, B6, B12, C, thiamine, riboflavin, niacin, pantothenic acid, folic acid, biotin), choline (15–70 mg) and myo-inositol (15–40 mg) per 100 ml of water.

Example 3

A fibre composition was prepared by mixing 31.2 wt. % of soy polysaccharide, 9.4 wt. % of α-cellulose, 21.4 wt. % of gum arabic, 8.5 wt. % of Raftilose® (hydrolyzed inulin), 10.6 wt. % of Raftiline® (inulin) and 18.8 wt. % of Novelose® (resistant starch). This blend was used in an amount of 1.5% w/w in a complete tube feed product containing the further components as described in example 2.

Example 4

A fibre composition was prepared by mixing 25.3 wt. % of soy polysaccharide, 7.3 wt. % of α-cellulose, 17.6 wt. % of gum arabic, 15.4 wt. % of Raftilose® (hydrolyzed inulin), 19.1 wt. % of Raftiline® (inulin) and 15.2 wt. % of Novelose® (resistant starch). This blend was used in an amount of 2.3% w/w in a complete dairy-based drink feed. The amounts (specified below) of dairy proteins (caseins or whey) were mixed with vegetable oils and carbohydrates such as maltodextrin and, if desired, an emulsifier such as soy lecithin. After homogenization and pasteurization, the product was packed in containers, such as 200 ml cartons.

The drink contains 10–15 energy % of protein, 40–60 en. % of carbohydrate, 30–45 en. % of fat including 15–45 en. % of PUFA's, in addition to (per 100 ml) Na (70–90 mg), K (130–170 mg), Cl (90–130 mg), Ca (40–80 mg), P (30–65 mg), Mg (15–40 mg), Fe (0.2–2.0 mg), Zn (1.3–2.1 mg), Cu (0.2–0.3 mg), Mn (0.3–0.7 mg),F (0.15–0.3 µg), Mo (7–10 µg), Se (5–206 µg), Cr (4–20 µg), I (15–19 µg) vitamins A (50–300 µg RE), D (0.6–1.1 µg), E (1.0–1.6 mg α-TE), K (5–10 µg), B12 (0.2–0.5 µg), C (5–15 mg), thiamine (0.1–0.25 mg), riboflavin (0.1–0.3 mg), niacinamide (2–5 mg NE), pantothenic acid (0.5–1.0 mg), pyridoxal (0.15–0.4 mg), folic acid (15–40 µg), biotin (10–30 µg) and choline (20–80 mg).

We claim:

1. Nutritional composition, suitable for enteral administration, containing 5–120 g of dietary fibre per daily dosage of the composition, the fibre consisting of 15–50 wt. % of soluble non-starch polysaccharides, 15–45 wt. % of insoluble non-starch polysaccharides, and 8–70 wt. % of a member selected from the group consisting of oligosaccharides, resistant starch and mixtures thereof, said composition further comprising 1–5 wt. % of lignin.

2. Nutritional composition according to claim 1, wherein the fibre consists of 20–40 wt. % of soluble non-starch polysaccharides and 20–40 wt. % of insoluble non-starch polysaccharides.

3. Nutritional composition according to claim 1, wherein the fibre consists of 8–40 wt. % of oligosaccharides.

4. Nutritional composition according to claim 3, wherein the fibre consists of 12–30 wt. % of oligosaccharides.

5. Nutritional composition according to claim 1, wherein the oligosaccharides are selected from a group consisting of inulin, hydrolyzed inulin and derivatives thereof.

6. Nutritional composition according to claim 1, wherein the oligosaccharides have an average degree of polymerization of 2 to 20 monosaccharide units.

7. Nutritional composition according to claim 1, wherein the fibre consists of oligosaccharides and of 5–30 wt. % of resistant starch.

8. Nutritional composition according to claim 7, wherein the fibre consists of 8–25 wt. % of resistant starch.

9. Nutritional composition according to claim 1, which contains 5–120 g of fibre per 2000 kcal of energy.

10. Nutritional composition according to claim 1, which is a dry composition and contains 0.5–100 g of fibre per 100 g.

11. Nutritional composition according to claim 1, which is a liquid composition after reconstitution, and contains 5–120 g of fibre per l.

12. Nutritional composition according to claim 11, which is a liquid composition after reconstitution, and contains 10–100 g of fibre per l after reconstitution.

13. Nutritional composition according to claim 1, wherein the composition does not contain chemically modified fibres.

14. Nutritional composition according to claim 1, wherein the composition further contains at least one member of the group consisting of carbohydrates, fats and proteinaceous materials.

15. Nutritional composition, suitable for enteral administration, containing 5–120 g of dietary fibre per daily dosage of the composition, the fibre consisting of 15–50 wt. % of soluble non-starch polysaccharides, 15–45 wt. % of insoluble non-starch polysaccharides, and 8–70 wt. % of a member selected from the group consisting of oligosaccharides, resistant starch and mixtures thereof, said oligosaccharides comprising a member selected from the group consisting of inulin, hydrolyzed inulin and derivatives thereof.

16. Nutritional composition according to claim 15, wherein the fibre consists of 20–40 wt. % of soluble non-starch polysaccharides and 20–40 wt. % of insoluble non-starch polysaccharides.

17. Nutritional composition according to claim 15, wherein the fibre consists of 8–40 wt. % of oligosaccharides.

18. Nutritional composition according to claim 17, wherein the fibre consists of 12–30 wt. % of oligosaccharides.

19. Nutritional composition according to claim 15, wherein the oligosaccharides have an average degree of polymerization of 2 to 20 monosaccharide units.

20. Nutritional composition according to claim 15, wherein the fibre consists of oligosaccharides and of 5–30 wt. % of resistant starch.

21. Nutritional composition according to claim 20, wherein the fibre consists of 8–25 wt. % of resistant starch.

22. Nutritional composition according to claim 15, which contains 5–120 g of fibre per 2000 kcal of energy.

23. Nutritional composition according to claim 15, which is a dry composition and contains 0.5–100 g of fibre per 100 g.

24. Nutritional composition according to claim 15, which is a liquid composition after reconstitution, and contains 5–120 g of fibre per l.

25. Nutritional composition according to claim 24, which is a liquid composition after reconstitution, and contains 10–100 of fibre per l after reconstitution.

26. Nutritional composition according to claim 15, wherein the composition does not contain chemically modified fibres.

27. Nutritional composition according to claim 15, wherein the composition further contains at least one member of the group consisting of carbohydrates, fats and proteinaceous materials.

* * * * *